United States Patent Office 2,836,546
Patented May 27, 1958

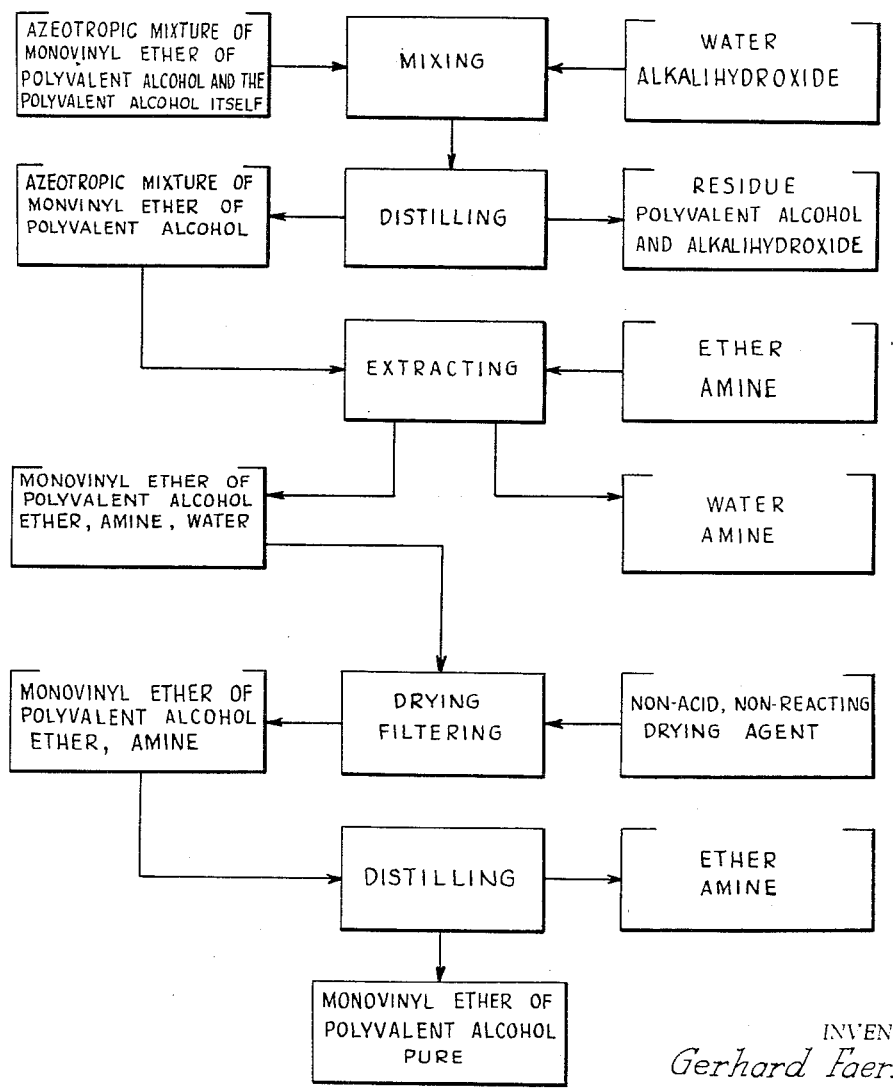

2,836,546

SEPARATION OF POLYHYDRIC ALCOHOLS AND MONOVINYL ETHERS THEREOF

Gerhard Faerber, Moers, Germany, assignor to Deutsche Solvay-Werke G. m. b. H., Solingen-Ohligs, Germany Application November 8, 1954, Serial No. 467,662

Claims priority, application Germany November 25, 1953

1 Claim. (Cl. 202—42)

The invention relates to a process for separating mixtures consisting of monovinyl ethers of polyhydric alcohols and the polyhydric alcohols themselves which mixtures result, as is known, from the treatment of polyhydric alcohols with acetylene in the presence of alkaline catalysts. These mixtures cannot be decomposed into their components by fractionating, since the monovinyl-ethers and the polyhydric alcohols from which they were made form azeotropic mixtures.

It has been proposed to separate vinyl ethers and alcohols in such a manner that the alcohols are separated as alcoholates and the vinyl ethers distilled off. This procedure, however, cannot be used for separating mixtures consisting of monovinyl ethers of polyhydric alcohols and the polyhydric alcohols themselves, since not only the alcohols, but also the monovinyl ethers themselves form alcoholates.

It has been found that while monovinyl ethers of polyhydric alcohols whose OH-groups are in 1:2- or 1:3-positions, or are even further separated from each other, form azeotropic mixtures with water, the polyhydric alcohols do not. On the basis of this discovery mixtures of monovinyl ethers of polyhydric alcohols and the polyhydric alcohols may be separated in a simple manner into their components by distilling the mixtures with water or subjecting them to a steam distillation, the monovinyl ethers distilling over as azeotropic mixtures with water and the polyhydric alcohols remaining behind in approximately quantitative yield.

In order to avoid decompositions, and particularly rearrangements which may occur since monovinyl ethers with OH-groups in 1:2 and 1:3 positions easily form cyclic acetals, it is preferable to subject to distillation a mixture to which small quantties of basic substances are added, for example alkali hydroxides preferably in quantities of 0.1–0.5% by weight. In order to obtain the monovinyl ethers of polyhydric alcohols in pure form, the mixture resulting from the distillation is extracted with a non-water soluble solvent.

The process according to the present invention may be applied to monovinyl ethers of glycols such as ethylene, propylene trimethylene, tetramethylene, or diethylene glycol. It may be used both for easily water-soluble and for only slightly water-soluble monovinyl ethers of polyhydric alcohols. The greater the molecular weight of the polyhydric alcohol is, the smaller is the concentration of the appropriate monovinyl ether in the aqueous azeotrope. The process may be carried out either intermittently or continuously.

The process is illustrated in flow sheet form of the drawing.

The parts quoted in the following examples are parts by weight, unless otherwise stated.

*Example 1*

547 parts of the azeotropic mixture of ethylene glycol monovinyl ether and ethylene glycol (it contains 13% ethylene glycol) are distilled, together with 1094 parts of water in which about 2 parts of sodium hydroxide have been previously dissolved, from a distillation apparatus, the receiver of which is supplied with one part of sodium hydroxide. At 98° C. and 760 mm. an azeotropic mixture distils over which contains 35% ethylene glycol monovinyl ether and 65% water. After distillation of 1200 parts the process is interrupted. Ethylene glycol remains behind in quantitative yield. The distillate is extracted three times with ether, the total quantity of ether used being equal to the quantity of distillate. About 5 parts of triethylamine are previously added to the ether. After drying with sodium sulphate or any other non-acid-reacting drying agent, the ether is distilled off. The residue is mixed with 0.1–0.5% sodium hydroxide and distilled in vacuo. After a slight preliminary running, pure ethylene glycol monovinyl ether passes over, B. P.$_{16}$ 54° C.; B. P.$_{760}$ 143° C.

C, H—Amount: Calculated, C=54.54, H=9.15%. Obtained, C=54.47, H=9.18%. $n_D^{20}$=1.4356.

The yield, calculated on the ethylene glycol monovinyl ether content of the glycol ether-glycol azeotrope, amounted to 85%.

*Example 2*

A mixture of 100 parts trimethylene glycol monovinyl ether/trimethylene glycol azeotrope (this contains 10–15% trimethylene glycol) and 250 parts of water to which one part of sodium hydroxide is added is poured into a distillation apparatus and distilled into a receiver which is supplied with a little sodium hydroxide. An azeotropic mixture, consisting of 25% trimethylene glycol monovinyl ether and 75% water, distils off at 100° C. Trimethylene glycol remains behind in quantitative yield. The trimethylene glycol monovinyl ether is separated from the water, and subsequently processed as described in Example 1.

Pure trimethylene glycol monovinyl ether boils at 77.5° C. and 25 mm.

C, H—Amount: Calculated, C=58.80, H=9.87%. Obtained, C=58.79, H=10.16%. $n_D^{20}$=1.4388.

The yield, calculated on the trimethylene glycol monovinyl ether content of the glycol ether-glycol azeotrope amounts to more than 75%.

*Example 3*

A solution of 1,000 parts of water, 3 parts of sodium hydroxide and 678 parts of the azeotropic mixture of tetramethylene glycol monovinyl ether and tetramethylene glycol is poured into a distillation apparatus which is heated through the intermediary of a heating fluid of high boiling point. The receiver of the distillation apparatus is supplied with two parts of sodium hydroxide. During the distillation 1556 more parts of water are added by dropping, or steam is blown in. The distillate consists of two layers. The lower is a solution of 10% tetramethylene glycol monovinyl ether and 90% water, the upper is mainly tetramethylene glycol monovinyl ether with a little water. After the separation of the layers the aqueous portion is extracted, as described in Example 1. Before the ether solution is dried the upper layer is added. Further processing is effected as in Example 1.

Pure tetramethylene glycol monovinyl ether boils at 85.5° C. and 13 mm.

C, H—Amount: Calculated, C=62.04, H=10.41%. Obtained, C=62.04, H=10.18%. $n_D^{20}$=1.4454.

The yield amounts to 83% of the tetramethylene glycol monovinyl ether content of the glycol ether-glycol azeotrope.

Example 4

A solution, consisting of 334 g. of the azeotropic mixture of propylene glycol monovinyl ether and propylene glycol and 668 g. of water in which 0.1–0.5% sodium hydroxide is dissolved, is placed in a 2 litre flask and distilled using an ordinary attachment (e. g. a Claisen attachment). A little sodium hydroxide is fed as in the above examples into the receiver. The azeotropic mixture of propylene glycol monovinyl ether and water boils at 101° C. and contains 25% monovinyl ether. The extraction and subsequent processing is effected as stated in Example 1.

Pure propylene glycol monovinyl ether boils at 49° C. and 16 mm. $n_D^{20}=1.4322$.

Example 5

50 g. of the azeotropic mixture of diethylene glycol monovinyl ether and diethylene glycol are mixed with 3,000 g. of water which contains 3 g. sodium hydroxide and distilled on an oil bath. The azeotrope boiling at nearly 100° C. contains 2–3% diethylene glycol monovinyl ether. The subsequent processing is effected as in Example 1.

C, H—Amount: Calculated, C=54.53, H=9.15%. Obtained, C=54.25, H=9.03%.

What I claim is:

A process for the separation of a mixture consisting of a monovinyl ether of a polyhydric alcohol and the polyhydric alcohol itself, comprising distilling the mixture with water, thereby distilling off an azeotropic mixture of the monovinyl ether and water, the residue being the polyhydric alcohol in approximately quantitative yield, adding to the mixture to be distilled 0.1 to 0.5% by weight of an alkali hydroxide.

References Cited in the file of this patent

UNITED STATES PATENTS

| | | |
|---|---|---|
| 2,472,084 | Beller et al. | June 7, 1949 |
| 2,527,916 | Churchill | Oct. 31, 1950 |
| 2,683,750 | Ellinger | July 13, 1954 |
| 2,691,048 | Francis | Oct. 5, 1954 |